United States Patent Office 2,809,612
Patented Oct. 15, 1957

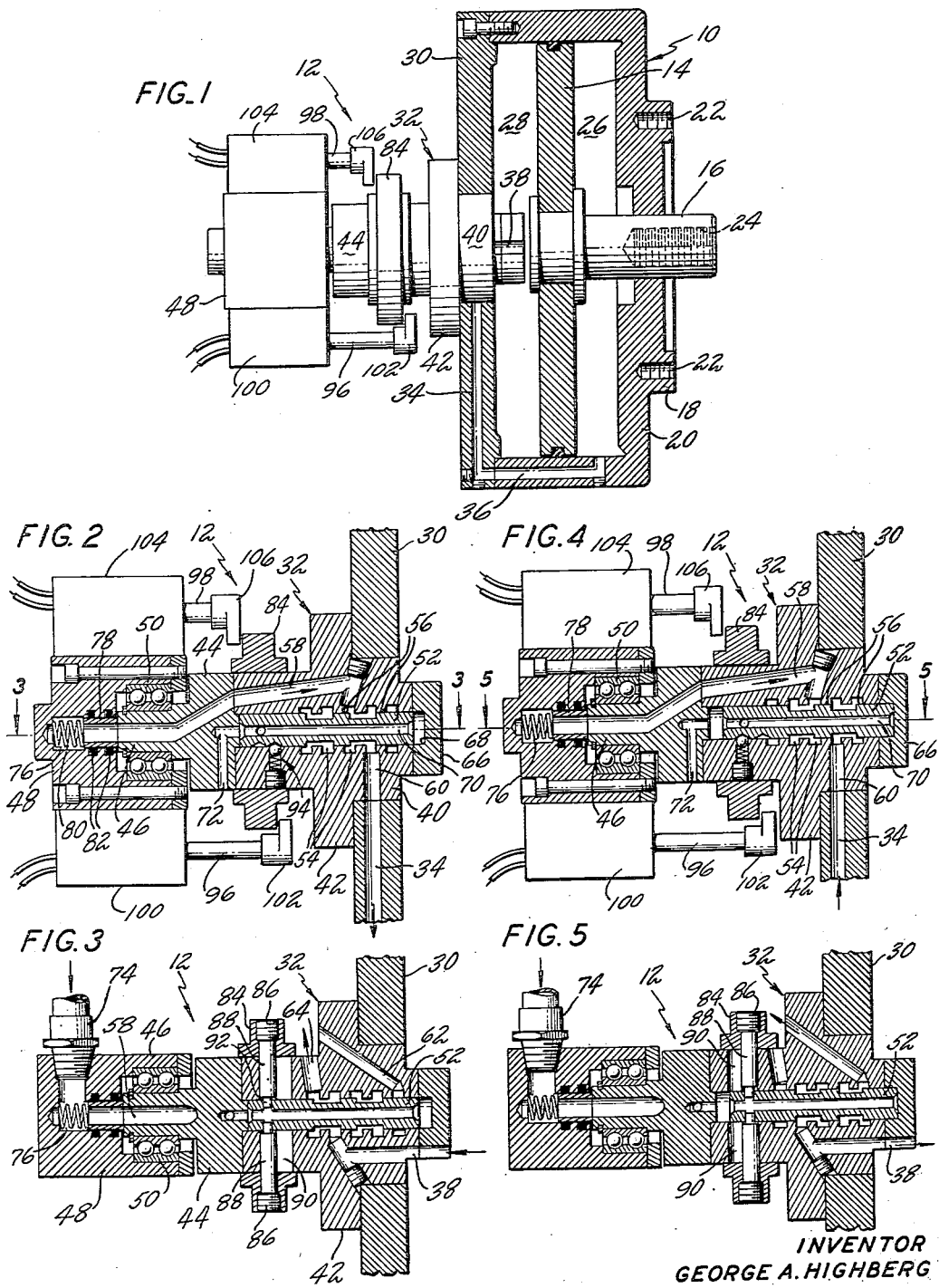

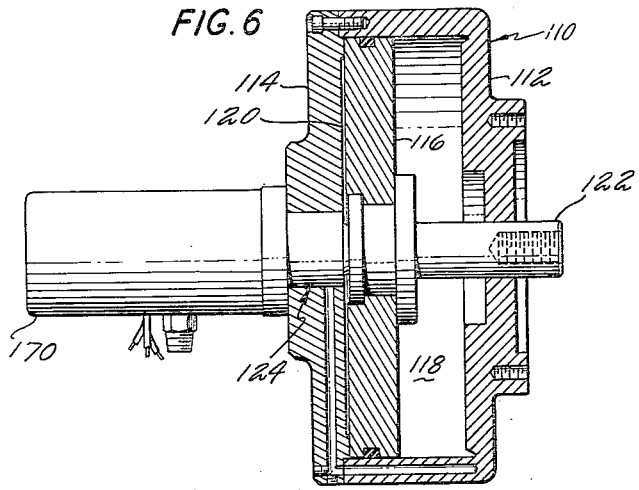
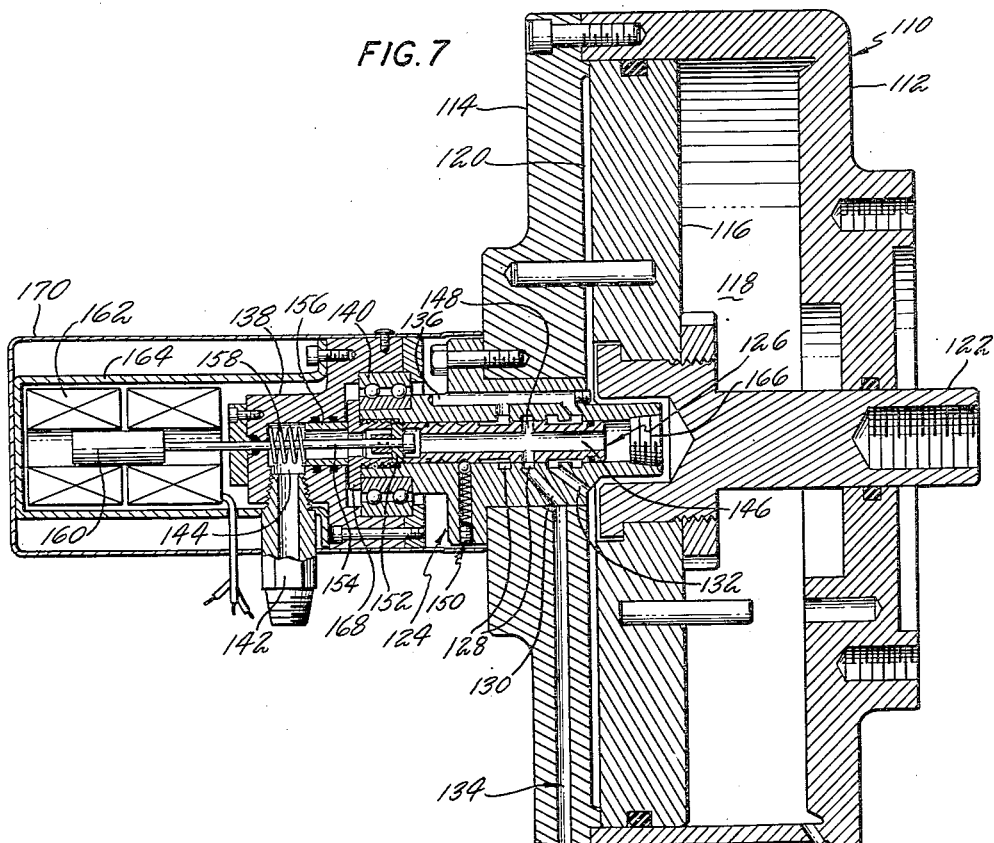

2,809,612

VALVE AND CYLINDER CONSTRUCTION FOR AN AIR OPERATED CHUCK

George A. Highberg, West Hartford, Conn., assignor to The Whiton Machine Company, New London, Conn., a corporation of Connecticut Application November 28, 1956, Serial No. 624,788

10 Claims. (Cl. 121—38)

This invention relates to an improved chuck for a machine tool, such as a lathe or the like, and the invention relates more specifically to an improved valve and cylinder construction for an air operated chuck of the aforesaid type.

It is the general object of the invention to provide a double acting rotatable air cylinder for a chuck which incorporates an air flow control valve as one of the rotating components whereby to eliminate the need for a non-rotating air valve and a plurality of air lines extending from such a valve to the air cylinder.

Other objects of the invention as well as features of construction provided in accordance therewith will become apparent to those skilled in the art from the following description having reference to the attached drawings wherein two embodiments of the invention are shown and wherein, Fig. 1 is a view showing the air cylinder and piston in cross section and the valve elements associated therewith in elevation;

Fig. 2 is an enlarged vertical cross-sectional view through the valve housing and a fragment of the rear wall of the air cylinder;

Fig. 3 is a horizontal cross-sectional view through the valve housing, the section being taken as indicated by the line 3—3 of Fig. 2;

Fig. 4 is a view similar to Fig. 2 but showing the valve in a second position;

Fig. 5 is a view similar to Fig. 3 taken as indicated by the line 5—5 of Fig. 4 and showing the valve in the aforesaid second position;

Fig. 6 is a view similar to Fig. 1 of an alternative form of construction; and

Fig. 7 is an enlarged view similar to Fig. 2 of the alternative form.

In the first form shown, the air cylinder is designated generally by the reference numeral 10 and the valve structure for controlling air flow to and from the cylinder is indicated generally by the reference numeral 12. The air cylinder and valve structure are associated as shown in Fig. 1 to provide an operating unit for any chuck of the general class having means for utilizing rectilinear reciprocation of a piston 14 within the air cylinder 10 as the operating force for opening and closing work-engaging and holding means. One chuck of this general class comprises a chuck body which supports a plurality of radially movable work-engaging jaws. The jaws are moved radially inwardly and outwardly toward and away from work-engaging positions by a plurality of bell cranks which are pivotally supported in the chuck body so that one end of each crank engages a jaw and the other end of each and every crank is engaged and thrust by a draw bar which is movable axially in the chuck body. The draw bar may be connected to a rod 16 which is reciprocated with the piston to effect opening and closing movement of the chuck jaws.

There are many other chucks of the same general class which are well known to those skilled in the art and which have means connectible with the piston rod 16 to effect work-engaging and disengaging movement from reciprocation of the piston 14 within the air cylinder 10. Since chucks of this general class are so well known, no specific chuck has been shown or will be described in detail. The air cylinder 10 is adapted for connection with any chuck of the aforedescribed class by being provided with a boss 18 on its front end 20 which boss has a plurality of tapped holes 22, 22 which can receive fastening screws. The operating unit is further adapted for connection with various chucks of the class mentioned by providing internal threads as indicated at 24 on the piston rod 16 whereby the piston rod can be connected to a chuck draw bar or its equivalent.

Obviously, the piston 14 is reciprocated within the air cylinder 10 by introducing air under pressure alternately to a chamber 26 defined between the piston 14 and the front wall 20 of the cylinder and a chamber 28 defined between the piston 14 and a rear wall 30 of the cylinder. A valve housing 32 is connected to the rear wall 30 of the air cylinder 10 and partly disposed within a central opening therein. A valve is selectively moved within the housing 32 as will be described to direct air under pressure to the chamber 26 or to the chamber 28. Air reaches the chamber 26 from the valve housing 32 through a passage 34 and a passage 36 in the rear wall and side wall of the air cylinder. Air reaches the chamber 28 through a passage 38 in the inner or front end of the said valve housing. The valve also operates to provide a vent for the chamber 28 while directing air under pressure to the chamber 26 and to provide a vent for the chamber 26 while introducing air under pressure to the chamber 28. Thus, one chamber within the air cylinder 10 is pressurized while the other chamber is vented to move the piston 14 in one direction whereby to effect work-engaging or disengaging operation of the chuck, and the said other chamber is pressurized while the said one chamber is vented to move the piston in the other direction whereby to effect work-disengaging or engaging operation of the chuck.

In accordance with the present invention, the valve housing 32 and the valve associated therewith rotate with the chuck and air cylinder and the valve housing is rotatably supported in a journal which receives air from a pressurized source and which also supports the valve actuating means. More specifically, the valve housing 32 comprises two parts, one being a generally cylindrical section 40 having a flange 42 which is secured to the rear wall 30 of the air cylinder so that a portion of the said section is disposed in the central opening therein. The other part of the housing 32 is also a generally cylindrical section 44 which is connected to the rear end of the first mentioned section 40 and which has a reduced diameter end 46 projecting into a journal or support block 48 and rotatably supported therein on a suitable anti-friction bearing unit 50.

The front section 40 of the valve housing 32 has a centrally disposed longitudinally extending bore which receives an axially movable valve 52. A plurality of longitudinally spaced apart annular grooves 54, 54 are provided in the wall of the said bore and the valve is provided with a plurality of longitudinally spaced apart lands 56, 56 which cooperate with the said grooves in axial movement of the valve 52 to provide control of the air flow from one or more of the said grooves to one or more of the other of the said grooves. An air inlet passage 58 in the two-section valve housing 32 communicates with one of the valve grooves 54, the said passage 58 extending from the reduced diameter end 46 of the valve housing and being located centrally in the said reduced diameter end. Another passage 60 in the valve housing communicates with another of the valve grooves and with the passage 34 in the rear wall 30 of the air cylinder which in turn communicates through the passage 36 with the air cylinder chamber 26. Another of the annular grooves in the valve bore communicates with the passage 38 in the valve housing which opens into the air cylinder chamber 28. Another of the valve bore grooves communicates with a passage 62 in the valve housing which provides a vent as does another passage 64 which communicates with still another of the grooves 54.

The aforesaid annular grooves 54, 54 in the valve housing bore may be characterized as valve ports which are selectively opened and closed by the valve lands 56, 56 during reciprocation of the valve 52 in the said bore whereby to effect selective communication between the ports and the passages in communication therewith. The valve 52 is selectively moved or reciprocated between two positions in the valve housing, these being the position shown in Figs. 2 and 3 and the position shown in Figs. 4 and 5. In the one position (that shown in Figs. 2 and 3) the valve 52 butts against the rear section 44 of the valve housing 32 and in the other position (that shown in Figs. 4 and 5) the valve 52 butts against a cap 66 secured to the front or inner end of the section 40 of the valve housing 32. It will be observed that the cap 66 has a cavity 68 in alignment with the bore in the valve housing to accommodate movement of the valve, and it will also be observed that the valve 52 has a central bore 70 communicating with a vent passage 72 in the rear section 44 of the valve housing for the escape of air entrapped within the bore in which the valve moves.

In the said one position of the valve 52 as shown in Figs. 2 and 3, air under pressure from the inlet passage 58 is directed through certain of the valve grooves or ports 54, 54 to the passage 60 and to the passage 34 whereby to supply the air cylinder chamber 26. Also in the said one position, the passage 38 which communicates with the air cylinder chamber 28 is connected through certain of the valve ports 54, 54 with the vent passage 64 whereby the chamber 28 is vented to atmosphere. It will also be observed that the vent passage 62 is closed by a valve land 56 at one of the valve ports 54. In the other position of the valve 52 as shown in Figs. 4 and 5, the inlet passage 58 communicates only with the passage 38 to the air cylinder chamber 28 through certain of the valve ports 54, 54, and the vent passage 62 communicates with the passages 60 and 34 and thus with the air cylinder chamber 26 through certain other valve ports 54, 54. It will be observed that in the said other position of the valve the vent passage 64 is closed by a land 56. Accordingly, in the said one position of the valve 52, pressurized flow is accommodated only to the air cylinder chamber 26 and vent flow is accommodated only from the air cylinder chamber 28, while in the other position of the valve, pressurized flow is accommodated only to the air cylinder chamber 28 while vent flow is accommodated only from the air cylinder chamber 26.

It is an important feature of the aforedescribed valve construction that the valve housing is secured to the air cylinder so that the said housing and the valve will rotate with the cylinder and with the chuck. By incorporating the valve in the construction of the rotating elements of the chuck operating unit in such a manner that the valve and its housing rotate on the axis of the chuck and air cylinder, only one air inlet passageway need be provided in the rotating parts, this being the inlet passage 58. Since it is necessary to provide only one inlet passage for air under pressure, the inlet end 46 of the valve housing can be of a minimum diameter and supported in an anti-friction bearing unit for high speed rotation. The pressurized air is introduced to the passage 58 through the journal or support block 48, the said block being adapted to receive a line 74 from a source of compressed air. A generally cylindrical chamber 76 is defined within the support block 48 in alignment with the passage 58 in the rear section of the valve housing and in communication with the compressed air line 74. A bored cylindrical seal member 78 is disposed within the chamber 76 and biased by a spring 80 into engagement with the end of the valve housing 32 so that its bore will provide a passageway between the said chamber and the inlet passage 58 of the valve housing. The seal member 78 is preferably made of carbon or other low friction material and, preferably, the cylindrical chamber 76 provides an oversized fit around said seal member. The seal member is embraced by O-ring seals 82, 82 within the chamber 76 and by reason of the relatively loose fit of the member within the chamber, the said member is self-aligned with the end of the valve housing but is in air-sealed engagement therewith. The spring 80 assures an air-tight engagement between the cylindrical seal member 78 and the end of the valve housing 32 and it also provides take-up means for wear of the said seal member.

The valve 52 is reciprocated or moved within the valve housing by means of a ring 84 which surrounds the valve housing 32 and rotates therewith. More specifically, the ring 84 surrounds the cylindrical rear portion of the front section 40 of the valve housing and is slidable longitudinally thereon. A pair of screws 86, 86 having non-threaded reduced diameter portions 88, 88 are threaded into the ring 84 preferably in diametrically opposed relationship and extend radially inwardly through a pair of slots 90, 90 defined in the front section of the valve housing, the said slots extending from the periphery of the housing to the valve-receiving bore therein. Each screw 86 has a reduced diameter projection or extension 92 on its inner end which is received in a suitable radially extending aperture in the valve 52.

Thus, when the valve ring 84 is moved longitudinally with respect to the valve housing, the valve 52 is moved axially in the valve bore, the limit of such movement being defined by the screw-receiving slots 90, 90 in the valve housing. When the ring 84 is pulled rearwardly to the limit of its movement, the valve 52 is disposed in the one position shown in Figs. 2 and 3, and when the ring 84 is pushed forwardly to the limit of its movement, the valve 52 is disposed in its other position as shown in Figs. 4 and 5. A spring biased ball detent indicated generally at 94 is provided in the valve housing 32 to engage the valve 52 to retain the valve in its said one position or its said other position after movement thereto by the ring 84.

The preferred valve actuating means or means for selectively shifting the valve control ring 84 comprises a pair of solenoid operated arms 96 and 98. The arm 96 is operated by a solenoid 100 which is secured to the support block or journal 48 and the said arm has a head 102 which is arranged to engage and pull the valve control ring 84 rearwardly to the "one" position when the solenoid 100 is energized. The arm 98 is operated by a solenoid 104 and has a head 106 which is arranged to engage and thrust the control ring 84 forwardly to place the valve in the "other" position when the solenoid 104 is energized. Obviously, the ring shifting arms and their solenoids do not rotate with the valve control ring 84. Therefore, in order to eliminate friction between these relatively moving parts after the ring has been shifted to selected positions, the arms 96 and 98 are limited in movement to positions where their ring-engaging heads will be out of engagement with the control ring while the valve and ring are retained in selected positions by the spring biased detent 94. More specifically, the arm 96 is pulled inwardly when the solenoid 100 is energized to engage the ring 84 and move the valve 52 out of the "other" position toward the "one" position, but final movement of the ring and valve to the one position is accomplished by the detent, the arm 96 having been stopped with its head 102 disposed as shown in Fig. 2. When the solenoid 100 is energized as described, electrical interlock means (not shown) de-energizes the solenoid 104 whereby the arm 98 is spring retracted to the position shown in Fig. 2 where its head 106 is out of engagement with the ring 84 while the valve 52 is in the said one position. When the solenoid 104 is energized, the arm 98 is pushed forwardly against the ring 84 to move the valve 52 from the said one position toward the said other position, but final movement of the ring and valve to the other position is accomplished by the detent, the arm 98 having been stopped in the position shown in Fig. 4. When the solenoid 104 is energized as described, the electrical interlock means de-energizes the solenoid 100 whereby the arm 96 is spring biased forwardly to the position shown in Fig. 4 where its head 102 is out of engagement with the ring 84 while the valve is in the said other position.

The operation of the control valve should be apparent from the foregoing description and further consideration thereof is unnecessary. However, it should be understood that such operation is effected to selectively position the valve and thus to effect selective movement of the piston within the air cylinder merely by energizing the valve actuating solenoids 100 and 104. These solenoids can be selectively energized by conventional switch means which can be located adjacent the solenoids or in a remote position if desired. It should also be understood that selective positioning of the valve as described is the only operation necessary to effect selective movement or operation of the work-holding means in the chuck. For example, when the solenoid 100 is energized to move the control ring 84 rearwardly and thus to position the valve 52 in its "one" position, the air cylinder chamber 26 is pressurized while the chamber 28 is vented. This causes the piston 14 to be moved in the air cylinder 10 so as to retract the piston rod 16 which motion can be said to effect closing movement of the jaws or other work-holding means in the chuck. When the solenoid 104 is energized to thrust the control ring 84 forwardly and to position the valve 52 in its "other" position, the air cylinder chamber 28 is pressurized while the chamber 26 is vented. This thrusts the piston and piston rod forwardly which may be said to effect opening movement of the jaws or other work-holding means in the chuck.

The alternative form of construction shown in Figs. 6 and 7 is similar to the first described embodiment of the invention, differing therefrom only in details of construction. The said alternative form comprises an air cylinder 110 having a front wall 112 and a detachable rear wall 114. A piston 116 is movable within the cylinder 110 in either axial direction, responsive to fluid pressure in the chamber 118 to be moved rearwardly and responsive to fluid pressure in the chamber 120 to be moved forwardly. As in the first described embodiment, a piston rod 122 is secured to the piston 116 for reciprocation therewith and is adapted to be connected to a chuck draw bar or the like.

A valve housing 124 is secured in a suitable central opening in the detachable rear wall 114 of the air cylinder and the said housing has a central longitudinal bore for accommodating longitudinal or axial reciprocation of a valve 126. The said valve housing also has a plurality of annular passages 128 around its bore one of which communicates with a passage 130 and another of which communicates with a passage 132. The passage 130 in the valve housing 124 communicates with passage means indicated generally at 134 extending to the air cylinder chamber 118 while the passage 132 communicates directly with the air cylinder chamber 120. There are two additional annular passages 128, 128 communicating with a vent passageway 136.

As in the first described embodiment, the valve 126 is movable in the valve housing selectively to connect the chamber 118 with a source of pressurized air while venting the chamber 120 or to connect the chamber 120 with the source of pressurized air while venting the chamber 118. Also as in the first described embodiment, the valve housing 124 is rotatable with the air cylinder and is journalled in a non-rotating block 138, being supported therein on an anti-friction bearing unit 140. An air fitting 142 is connected with the block 138 to pass air from a pressurized source (not shown) to passage means comprising a longitudinally extending chamber 144 in the said block. The alternative form of construction differs from the first described embodiment in that air passes from the chamber 144 directly into the valve 126 rather than passing through the valve housing before communicating with the valve. More specifically, the air is received in a central longitudinal bore 146 in the valve 126 and then passes through a radial bore 148 selectively into the annular passage 128 which communicates with the passage 130 or into the annular passage 128 which communicates with the passage 132. It will be observed that the valve 126 has a plurality of lands which selectively open and close the annular passages 128, 128 in the valve housing 124 when the valve 126 is moved longitudinally in the said housing between two positions.

In one position of the valve 126 as shown in Fig. 7, the pressurized air flows from the longitudinal bore 146 and the radial bore 148 into the valve housing passage 130 which communicates with the air cylinder chamber 118. Also in said one position of the valve, the air cylinder chamber 120 is vented through the valve housing passage 132, annular passages 128, 128 and the vent passage 136. It will be observed that the said "one" position of the valve 126 is a rearward position and that the valve is held in such position by a spring biased detent indicated generally at 150.

The other position of the valve 126 is a forward position wherein the longitudinal bore 146 and the radial bore 148 of the valve communicate with the valve housing passage 132 to supply the air cylinder chamber 120 with pressurized air. In such position of the valve, the air cylinder chamber 118 is vented through the passage 130, annular passages 128, 128 and the vent passageway 136. The said valve is held in the said other position by the previously mentioned spring biased detent 150.

As in the first described embodiment, the valve 126 is shifted from its said one to said other position position by solenoid operated means, but the solenoid arrangement and valve operating structure is somewhat different. That is, a strap 152 is secured across the rear end of the valve 126 as by welding or the like so as not to interfere with the passage of air from the block 138 into the longitudinal valve bore 146. An elongated rod 154 is secured to the strap 152 and extends rearwardly thereof through a cylindrical seal 156 and a spring 158 which biases said seal forwardly in the chamber 144, and the rod extends rearwardly of the block 138 and is secured to a longitudinally movable armature 160 in a double-acting solenoid 162. It will be observed that the solenoid 162 is of the double-coil type and is mounted centrally and rearwardly of the block 138 in a housing 164 which is secured to the said block. The solenoid coils can be selectively energized to move the armature forwardly and rearwardly whereby to move the valve 126 forwardly from its one position to its other position and rearwardly from its other position to its one position. Forward movement of the valve is limited by its engagement with a plug 166 which is threaded into the front end of the bore in the valve housing and rearward movement of the valve is limited by engagement of the strap 152 with a hollow plug 168 which is threaded into the rear end of the bore in the valve housing. Obviously, the solenoid coils need only be energized to shift the valve and can then be de-energized because the detent 150 is provided to retain the valve in selected position.

The alternative form of construction has an advantage over the first described embodiment of the invention in that the construction is more compact and in that all of the valve operating elements including the solenoid can be enclosed within a cover 170 which is detachably secured to the block 138. Both embodiments incorporate a valve housing which is rotatable with the air cylinder and chuck and both embodiments incorporate a valve which requires only a single air inlet passage or conduit connectible with a source of pressurized air. This is one of the principal features of construction and advantages provided by the present invention, and it is this feature which permits the incorporation of a valve housing having a relatively small diameter at the end where it is journalled in a non-rotating support whereby a conventional anti-friction bearing unit can be employed to accommodate high speed chuck rotation. It is also an important feature of construction incorporated in both embodiments that a self-centering spring biased cylindrical seal member can be employed to engage the rotatable elements of the valve construction at the journal.

Obviously, there are other modifications and alternative forms of construction which can be accomplished within the scope of the invention as indicated by the following claims.

The invention claimed is:

1. A compressed air operating unit for a machine tool chuck and comprising in combination, a rotatable air cylinder having two chambers and a piston movable therein responsive to fluid pressure in the chambers, the piston being adapted for connection with a chuck to operate the work-holding means thereof, a valve housing secured to said cylinder for rotation therewith and having a vent passage and passages communicating with the respective cylinder chambers, non-rotating means journalling said valve housing and having passage means connectible with a source of compressed air, a valve disposed in said housing and movable between two positions therein, said valve being adapted in one of its positions to connect said passage means with the passage communicating with one chamber while connecting the passage communicating with the other chamber to said vent passage and said valve being adapted in its other position to connect said passage means with the passage communicating with said other chamber while connecting the passage communicating with said one chamber to said vent passage, and operating means for moving said valve between its said one and other positions.

2. A compressed air operating unit for a machine tool chuck and comprising in combination, a rotatable air cylinder having two chambers and a piston movable therein responsive to fluid pressure in the chambers, the piston being adapted for connection with a chuck to operate the work-holding means thereof, a valve housing secured to said cylinder for rotation therewith on a common axis and having a vent passage and passages communicating with the respective cylinder chambers, non-rotating means journalling said valve housing and having passage means connectible with a source of compressed air, a valve disposed in said housing and movable on said common axis between two positions therein, said valve being adapted in one of its positions to connect said passage means with the passage communicating with one chamber while connecting the passage communicating with the other chamber to said vent passage and said valve being adapted in its other position to connect said passage means with the passage communicating with said other chamber while connecting the passage communicating with said one chamber to said vent passage, and electrically operable means for moving said valve between its said one and other positions.

3. A compressed air operating unit for a machine tool chuck and comprising in combination, a rotatable air cylinder having two chambers and a piston movable therein responsive to fluid pressure in the chambers, the piston being adapted for connection with a chuck to operate the work-holding means thereof, a valve housing secured to said cylinder for rotation therewith on a common axis and having a vent passage and passages communicating with the respective cylinder chambers, non-rotating means journalling said valve housing and having passage means connectible with a source of compressed air, a valve disposed in said housing and movable on said common axis between two positions therein, said valve being adapted in one of its positions to connect said passage means with the passage communicating with one chamber while connecting the passage communicating with the other chamber to said vent passage and said valve being adapted in its other position to connect said passage means with the passage communicating with said other chamber while connecting the passage communicating with said one chamber to said vent passage, electrically operable means for moving said valve between its said one and other positions, and detent means for retaining the said valve selectively in its said one and other positions.

4. A compressed air operating unit for a machine tool chuck and comprising in combination, a rotatable air cylinder having two chambers and a piston movable therein responsive to fluid pressure in the chambers, the piston being adapted for connection with a chuck to operate the work-holding means thereof, a valve housing secured to said cylinder for rotation therewith and having a vent passage and passages communicating with the respecive cylinder chambers, non-rotating means journalling said valve housing and having passage means connectible with a source of compressed air, a valve disposed in said housing and movable between two positions therein, said valve being provided with a longitudinal bore in communication with said passage means and being adapted in one of its positions to connect its bore with the passage communicating with one chamber while connecting the passage communicating with the other chamber to said vent passage and said valve being adapted in its other position to connect its bore with the passage communicating with said other chamber while connecting the passage communicating with said one chamber to said vent passage, and operating means for moving said valve between its said one and other positions.

5. A compressed air operating unit for a machine tool chuck and comprising in combination, a rotatable air cylinder having two chambers and a piston movable therein responsive to fluid pressure in the chambers, the piston being adapted for connection with a chuck to operate the work-holding means thereof, a valve housing secured to said cylinder for rotation therewith on a common axis and having a vent passage and passages communicating with the respective cylinder chambers, a non-rotating block journalling said valve housing and having passage means connectible with a source of compressed air, a valve disposed in said housing and movable on said axis between two positions, said valve being provided with a longitudinal bore in communication with said passage means and being adapted in one of its positions to connect its bore with the passage communicating with one chamber while connecting the passage communicating with the other chamber to said vent passage and said valve being adapted in its other position to connect its bore with the passage communicating with said other chamber while connecting the passage communicating with said one chamber to said vent passage, and operating means for moving said valve between its said one and other positions comprising a rod extending through said support block and connected with said valve, said rod being movable longitudinally to shift said valve on the common axis.

6. An operating unit for a machine tool chuck as defined in claim 4 wherein the operating means for said valve comprises a double-acting solenoid mounted on said non-rotating means, and a rod secured to said valve and movable by said solenoid to shift said valve between its said one and other positions.

7. A compressed air operating unit for a machine tool chuck as defined in claim 5 and including a solenoid mounted on said support block and operatively associated with said rod to move the valve between its said one and other positions, and also including detent means for retaining said valve in its said one and other positions.

8. A compressed air operating unit for a machine tool chuck and comprising in combination, a rotatable air cylinder having two chambers and a piston movable therein responsive to fluid pressure in the chambers, the piston being adapted for connection with a chuck to operate the work-holding means thereof, a valve housing rotatable with the cylinder and having a plurality of passages comprising an inlet, a vent, and other passages providing communication with the respective cylinder chambers, non-rotating means for connecting the inlet passage with a source of compressed air, a valve in said housing movable between one position to connect one of said chambers with the inlet and to connect the other chamber with the vent and another position to connect said other chamber to the inlet and to connect said one chamber to the vent, and valve operating means comprising means connected with the valve and rotatable with the housing and also comprising non-rotating means selectively engageable with the rotatable means to move said valve between its said one and other positions.

9. A compressed air operating unit for a machine tool chuck and comprising in combination, a rotatable air cylinder having two chambers and a piston movable therein responsive to fluid pressure in the chambers, the piston being adapted for connection with a chuck to operate the work-holding means thereof, a valve housing rotatable with the cylinder on a common axis and having an inlet passage and a vent passage and also having passages communicating with the respective cylinder chambers, non-rotating means for connecting the inlet passage with a source of compressed air, a valve in said housing movable along the axis of rotation thereof between one position to connect one of the said chambers with the inlet and to connect the other chamber with the vent and another position to connect said other chamber with the inlet and to connect said one chamber with the vent, and valve operating means including a ring surrounding said housing and slidable axially thereon, means extending radially inwardly from said ring through said housing and engaging said valve, the said housing being adapted to accommodate limited axial movement of the ring and valve whereby to selectively position the valve by movement of the ring relative to the housing.

10. A compressed air operating unit for a machine tool chuck and comprising in combination, a rotatable air cylinder having two chambers and a piston movable therein responsive to fluid under pressure in the chambers, the piston being adapted for connection with a chuck to operate the work-holding means thereof, a valve housing rotatable with the cylinder on a common axis and having an inlet passage and a vent passage and also having passages providing communication with the respective cylinder chambers, non-rotating means for connecting the inlet passage with a source of compressed air, a valve in said housing movable along the axis of rotation thereof between one position to connect one of said chambers with the inlet and to connect the other chamber with the vent and another position to connect said other chamber with the inlet and to connect said one chamber with the vent, and valve operating means comprising a control ring surrounding said housing and slidable axially thereon, at least one screw extending from said ring through said housing into engagement with the valve, the said housing being provided with at least one slot accommodating said screw for limited axial movement of the ring and the valve whereby to selectively position the valve in its said one and other positions, and power operated means selectively engageable with the ring to move the same axially of the housing.

No references cited.